Oct. 1, 1935.  J. H. HERMAN  2,016,233
SANDWICH MAKING APPARATUS
Filed May 19, 1933  3 Sheets-Sheet 1
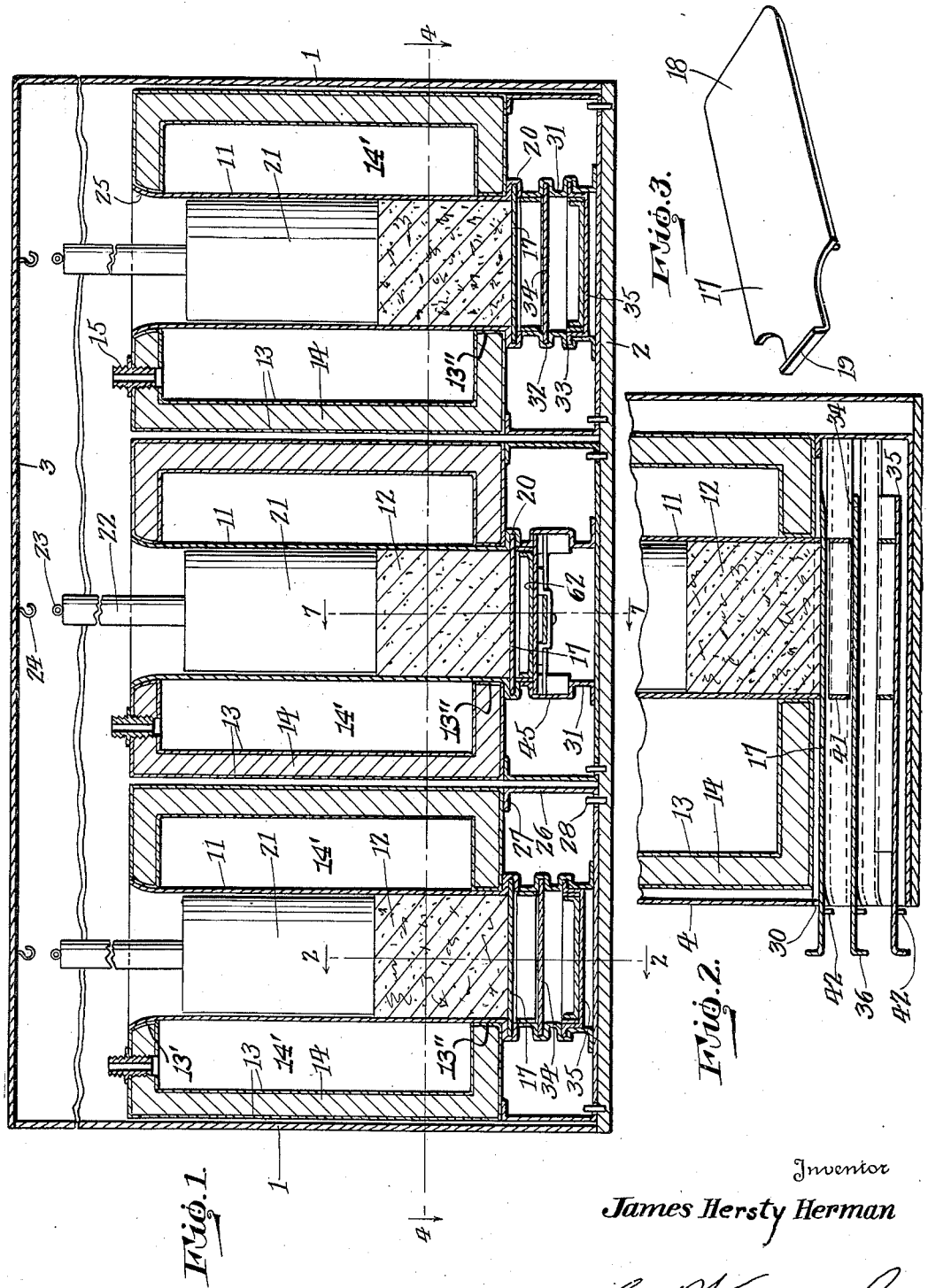
Inventor
James Hersty Herman
By Geo. P. Kimmel
Attorney

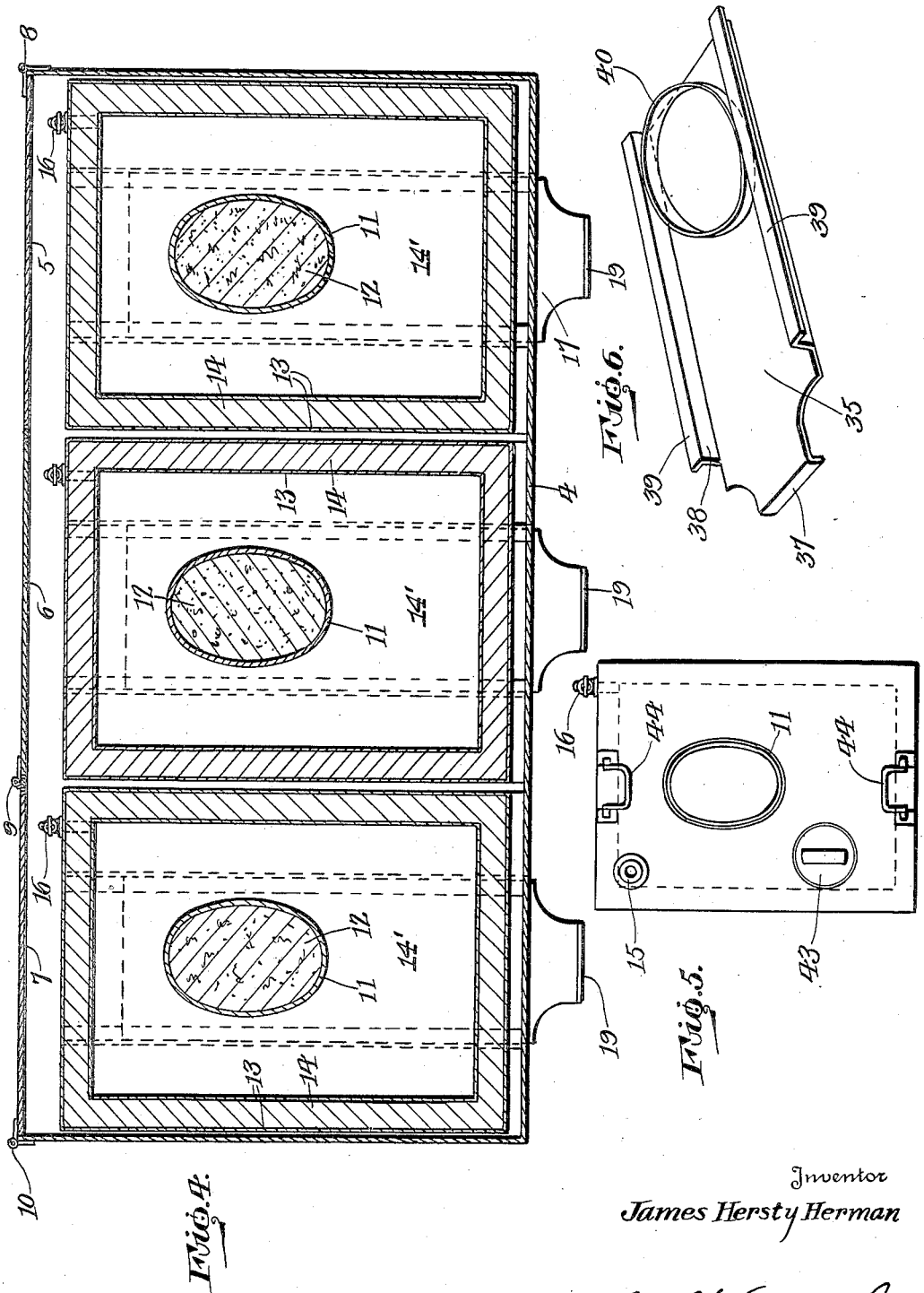

Oct. 1, 1935.    J. H. HERMAN    2,016,233
SANDWICH MAKING APPARATUS
Filed May 19, 1933    3 Sheets-Sheet 3
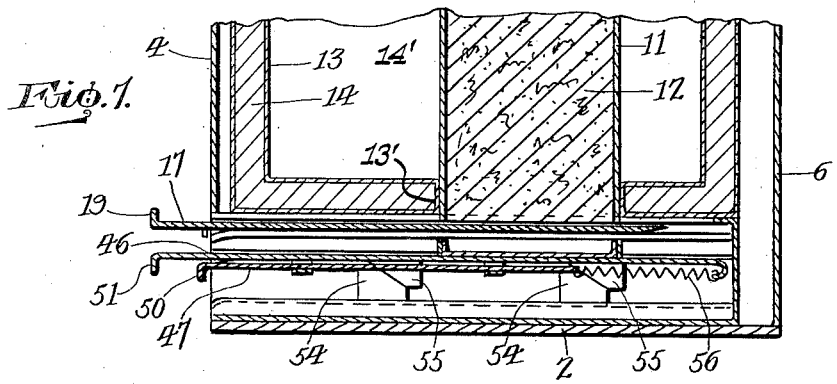
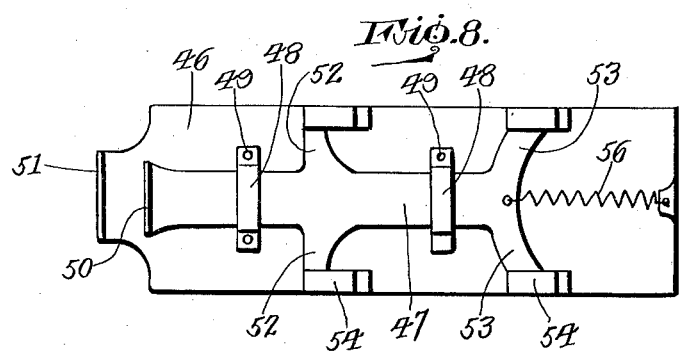
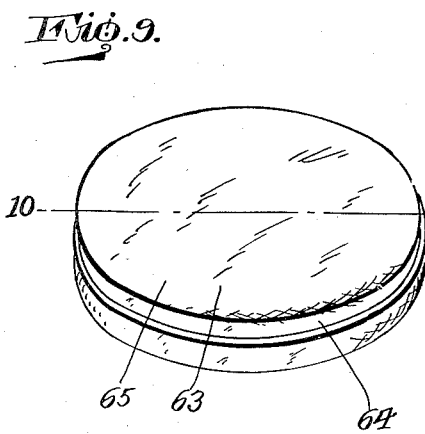
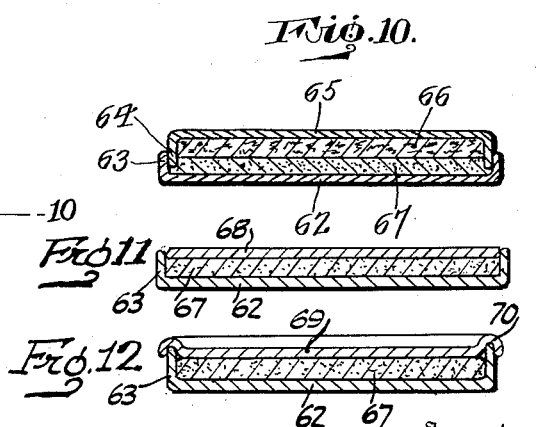
Inventor
*James Hersty Herman*
By *Geo. P. Kimmel*
Attorney Patented Oct. 1, 1935

2,016,233

UNITED STATES PATENT OFFICE 2,016,233

SANDWICH MAKING APPARATUS

James H. Herman, Austin, Tex., assignor of one-tenth to J. J. Allman, Austin, Tex.

Application May 19, 1933, Serial No. 671,919

4 Claims. (Cl. 107—1)

This invention relates in general to the preparation and dispensing of foods, and more particularly has reference to a sandwich and to the method and means of making the same.

Sandwiches have in the past been formed from a filler of solid or substantially solid material usually held between two slices of bread or the like. The solid or semi-solid filler material supply has usually been kept out in the open subject to the various temperature changes that might take place as well as being exposed to dust, dirt and other grime with which it might have to come in contact. Frequently the lunch stands which dispense such articles are located alongside of dusty highways in which location it is practically impossible to keep dust from settling on the foods without having those foods completely enclosed at all times. Furthermore, in the past it has been impossible to provide a sandwich composed of a filler material having any considerable amount of juices therewith without those juices leaking either through the outer layers of bread or out between their edges. It has also been impossible under the previous practice to easily and quickly dispense the sandwiches the filler for which is kept at the temperature at which the sandwiches are desired to be dispensed. It has been necessary in such instance to keep the sandwich material either in a cooler or over a fire until such time as the sandwich was to be dispensed and then to remove the same, slice off the amount of filler material required, and replace the supply in the device for maintaining its temperature. This not only exposes the entire mass of filler material to such dust and dirt as may settle upon it while being used, but also requires considerable time and is hence costly.

It is therefore one of the objects of this invention to provide a sandwich in which the filler material may be composed partly of liquids, without the danger of those liquids leaking out either through the outer layers or around the edges. It is furthermore an object to produce a sandwich biscuit having such shape and properties as to produce the above result.

Furthermore, it is an object of this invention to produce a machine for making sandwiches, in which the filler material will be at all times wholly enclosed and prevented from contact by the outer air, while at the same time providing for maintaining either a hot or cold temperature of such filler material. It is an object that this filler material shall be set upon one of the outer layers of the sandwich in exactly the proper shape and thickness for a single sandwich whereby a sandwich may be prepared without the filler being touched by the operator.

Yet another object of this invention is the provision of a means for preparing a filler composed partly of liquid materials in such manner that such filler may be easily handled without the hands coming in contact directly with the filler, and at the same time forming it into such shape that it will fit perfectly into the machine disclosed in this application. It is an object that in the preparation of the filler material both the liquid and the solid portions of the filler material shall be formed into a single solid mass whereby the body of filler material may be more easily handled.

Other objects and advantages of this invention will become apparent from the following description taken in connection with the accompanying drawings, it being distinctly understood that the same are by way of illustration and example only and are not to be taken as in any way limiting the spirit or scope of this invention. The spirit and scope of this invention is to be limited only by the prior art and by the terms of the appended claims.

Referring now more particularly to the drawings in which like numerals indicate corresponding parts throughout:

Figure 1 is a vertical cross section of a sandwich preparing machine constructed in accordance with this invention.

Figure 2 is a section taken along the line 2—2 of Figure 1.

Figure 3 is a perspective view of the slidable knife for slicing off portions of the filler material as desired.

Figure 4 is a section taken along the line 4—4 of Figure 1.

Figure 5 is a plan view of one of the units illustrated in Figure 1.

Figure 6 is a perspective view similar to Figure 3 and illustrating the tray for holding one of the outer layers of the sandwich in a position to receive the slice of filler material.

Figure 7 is a view taken along the line 7—7 of Figure 1.

Figure 8 is a view showing the bottom of a modified form of tray for holding the outer layers of sandwich in position to receive the filler.

Figure 9 is a perspective view illustrating a sandwich constructed in accordance with this invention.

Figure 10 is a view taken along the line 10—10 of Figure 9.

Figure 11 is a view similar to Figure 10 and illustrating a modified form of sandwich constructed in accordance with this invention.

Figure 12 is a similar view illustrating a still further modification of sandwich.

In accordance with this invention, a cabinet is provided having end walls 1, a bottom wall 2, a top wall 3, a front wall 4 and a series of doors 5, 6 and 7 hinged respectively at 8, 9 and 10 forming the rear wall thereof. Within this cabinet are placed a series of units corresponding in number with the rear doors just mentioned and of such dimension that they may be withdrawn through these doors.

Each of these units consists of a receptacle 11 of oval shape preferably for the purpose of receiving a body of filler material 12. Surrounding each receptacle an insulating structure formed of a rectangular body part provided at its top and its bottom with an inwardly extending flange. The insulating structure consists of inner and outer metallic sections 13 arranged in parallel spaced relation and an intermediate section 14 of insulating material filling the space formed between the said other sections. The said outer section is formed with an upper flared oval shaped flange 13' which is integral with the said inner section. The said outer section is also formed with a lower oval-shaped flange 13" which is integral with the said inner section. The flanges abut the end edges of the said intermediate section. The receptacle 11 abuts the flanges on said outer section and forms in connection with the said insulating structure a chamber or jacket 14' which completely surrounds the major portion of the length of said receptacle 11. The latter is open at its top and bottom and depends below flange 13".

The insulating structure at its top is formed with an inlet fitting 15 for chamber or jacket 14' and in close proximity to its bottom, at its rear side with an outlet fitting 16 for chamber or jacket 14'. Thus, a liquid or other substance may be introduced into this jacket for the purpose of maintaining the temperature of the filler material within the receptacle 11 at whatever temperature may be desired. Such substances for instance as either brine or steam may be introduced and passed through these jackets for the purpose of keeping the filler material either hot or cold. Other means may, of course, be employed for the same purpose it being within the scope of this invention to employ whatever device seems best suited to the particular situation in each case.

At the bottom of each receptacle 11 and below the bottom of the insulating structure referred to, there is provided a sliding knife 17 having a cutting edge 18 at one end thereof and a handle member 19 at the other end thereof by which it may be operated. This knife is arranged to be slid inwardly and outwardly along a slideway 20 provided for that purpose, this slideway being positioned so as to maintain the knife normally snugly against the bottom end of the receptacle 11. Thus, it will be seen that the knife ordinarily forms a bottom for the receptacle upon which the body of filler material 12 will rest. It is to be noted that the entire unit just described may be removed from the cabinet for the purpose of recharging, cleaning or other reasons.

For the purpose of normally pressing the body of filler material 12 downwardly within the receptacles 11, each receptacle is provided with a weighted object 21 of a size to just fit within the receptacle and press against the upper surface of the body of filler material. Each weighted object 21 is formed with an upwardly extending stem 22 provided at its uppermost end with an eye 23 adapted to engage a hook 24 secured to the top wall of the cabinet. It is to be understood that the top wall of the cabinet is to be spaced from the upper end of the receptacles 11 a sufficient distance to allow the weighted objects 21 to be withdrawn therefrom and suspended from the hooks 24 at a position above the top of the receptacles. Thus, the weights 21 will be suspended out of the way while the units previously described are being withdrawn as set forth. It is to be noted in this connection that the upper end of each receptacle 11 is flared slightly as at 25 so that the body of filler material or the weight 21 may be more easily inserted therein.

Below the removable units, there is provided an open top supporting element 26 having a flange 27 at its upper edge for the purpose of receiving and supporting the removable units. This supporting element 26 is continuous along the bottom of the cabinet and is properly positioned by means of dowels 28 engaging in holes 29 therein and fixed within the bottom wall 2 of the cabinet. The front wall 4 of the cabinet adjacent its bottom is provided with a series of spaced parallel vertical openings 30, each associated with a removable unit for the purpose of allowing the handle portion 19 of the knife 17 as well as the other sliding elements, to be referred to which associate with a unit and extend into the cabinet. Mounted on the bottom portion of the element 26 is a pair of upstanding oppositely disposed spaced parallel oblong plates 31 extending from the front to the rear of element 26, as well as from the bottom of the latter to the receptacle 11. The plates 31 are shaped to provide the slideway 20, as well as guideways 32 and 33 respectively for the purpose of receiving the support 34 and the slidable tray 35. The support 34 is exactly similar to the knife 17 with the exception that it is not provided with a sharp edge and that its handle portion 36 is turned downwardly instead of upwardly. The tray 35 is likewise provided with a downwardly turned handle 37 and is bent upwardly at its sides 38 to form a channel shaped member. These sides are in turn bent outwardly at 39 to fit within the guide 33 provided therefor. Mounted between the two upstanding side walls 38 there is provided an open top upstanding combined holder, receiver and positioner element 40 adapted to receive, hold and position one of the outer layers of a sandwich in direct alignment with the receptacle 11 and the body of filler material. This upstanding element 40 is of substantially the same size and shape as the receptacle 11 and is so positioned as to lie directly beneath said receptacle when the tray 35 is in its normal position.

Between the knife 17 and the support 34 there is provided a combined guide and retainer element 41 forming a continuation of the receptacle 11 and adapted to receive the lower end of the body of filler material when the knife 17 is withdrawn. This element 41 is of sufficient extent to contain a body of filler material of exactly the size desired for a single sandwich. As will be seen in Figure 2, the knife 17, the support 34, and the tray 35 are each provided with a stop 42 adapted to limit their inward movements so as to properly position them with respect to the receptacles 11. This is particularly important in connection with the tray 35 because of the fact that the upstanding flange 40 must be positioned directly beneath the body of filler material so as to receive the filler for the sandwich.

It will be noted in connection with Figure 5 that each of the units previously described, besides being provided with an upper inlet fitting 15 and a lower outlet fitting 16 is also provided with a removable plug 43 through which cracked ice or the like may be placed within the jacket. Each unit is likewise provided with a pair of handles 44 at opposite sides of the top thereof to facilitate handling.

The unit illustrated in the central portion of Figure 1 and illustrated in part in Figures 7 and 8 is slightly different from that just described. Instead of being provided with guideways 32 and 33 for the purpose of receiving a support 34 and tray 35, the upstanding wall 31 is provided with only one guideway 45 which, however, is of considerably greater extent than either of the guideways 32 or 33. Received within the guideway 45 is a tray which so far as its upper portion is concerned is substantially the same as the tray 35. This tray 46, however, instead of riding on the side flanges 39 within the guideway 45 is itself provided with a slide 47 slidably positioned on the bottom thereof by means of a pair of straps 48 secured in place by means of rivets 49. This slide is provided with a handle 50 adjacent the handle 51 of the tray and is provided with laterally extending arms 52 and 53 carrying wedges 54 at the outer ends thereof. The tray is provided with wedges 55 adapted to cooperate with the wedges 54 so as to raise the tray with respect to these wedges when the slide 47 is moved to the right as viewed in Figures 7 and 8. This slide is normally urged to the right by means of a spring 56 secured to the inner end of the tray 46 and of the slide 47. The lower faces of the wedge members 54 are adapted to ride upon the lower side of the guide 45.

Thus it will be seen that when the slide handle 50 is pulled outwardly to a position adjacent the tray handle 51, the tray will be in a relatively low position and may be inserted or withdrawn from its guideway 45 the same as the tray 35. However, when it is in position and the slide 47 is released, it will be pulled back by the spring 56 to such a position as to raise the tray 46 to a position adjacent the knife 17. The various parts are so adjusted that the tray will be raised by an amount just sufficient that when the knife 17 is withdrawn the body of filler material will drop down an amount sufficient so that when the knife is reinserted it will sever a portion of the filler material of the size required for a single sandwich. Thus it will be seen that in this form the tray itself furnishes a support for the lower end of the body of filler material during the severing operation, thus doing away with the necessity for the slide 34.

With reference now to Figures 9, 10, 11 and 12, there are illustrated various forms of sandwich which may be produced with this machine. In the first place, it is noted that in order to provide for receiving a filler material which is partly composed of liquid, without allowing such liquid to escape from the sandwich, each sandwich illustrated has its lower portion composed of a flat sandwich biscuit having a flat bottom 62 of the desired shape of the sandwich and having an upturned continuous rim 63 for the purpose of retaining the liquid. In Figures 9 and 10, the upper portion of the sandwich is likewise formed in the same manner with a downwardly extending rim 64 and an upper flat portion 65. In this instance, the sandwich is illustrated as being composed of two kinds of filler. The upper portion of the sandwich may be filled with any suitable vegetable material for instance such as relish or the like 66 whereas the lower portion may be filled with a meat 67, after which the two portions are placed together as illustrated. It is noteworthy that the upstanding rim 63 and the downwardly extending rim 64 are of such a size as to telescope one within the other, thus forming a completely closed container for the sandwich filler.

With reference to Figures 11 and 12, it will be seen that the lower portion of the sandwich is formed in the same manner as that illustrated in Figures 9 and 10, but that the upper portion in each instance is of a slightly different form. In each of these instances, the sandwich is formed of a single variety of filler material so that the necessity for the rim in the upper layer of the sandwich is not so great as in the case illustrated in Figure 10. The upper layer of the sandwich in Figure 14 is therefore formed of a single flat disc-like sandwich biscuit 68 of a size to just fit within the upturned rim 63 of the lower layer. A closed container is thus formed for the sandwich filler the same as in Figure 10. In Figure 12, the same situation exists except for the fact that the upper layer is formed of a sandwich biscuit having a flattened central portion 69 and having its marginal portions 70 turned first upwardly and then downwardly so as to in a measure embrace the upturned rim 63 of the lower layer of the sandwich.

It is believed that the operation of the above described invention will be apparent from the description thereof. After the body of filler material has been placed within the receptacle 11 as previously set forth and the jacket around the receptacle 11 has been provided with a cooling or heating material for the purpose of maintaining the temperature of the filler, one of the sandwich biscuits 62 illustrated in Figures 9, 10, 11 and 12 is placed within the flange 40 of the tray 35 or 46. This tray is then shoved home within its guideway and in the case of the tray 46 is allowed to be raised by means of the slide 47.

The knife 17 is then withdrawn thereby allowing the weighted object 21 to force the body of filler material 12 downwardly against the upper surface of the support 34 or into the sandwich biscuit 62 upon the tray 46 as the case may be. The knife is then pushed back into its position thereby slicing off a portion of the sandwich filler sufficient to fill a single sandwich. It is to be noted at this point that the sandwich filler and the receptacle 11 are made oval shaped so that the knife might more easily sever a portion of the filler material. Thus, the knife begins at one end of the oval where there is only a short width of material to be cut and finishes likewise at the other end of the oval where there is only a short width of material to be cut. When the knife is moved as just described to cut off a portion of the filler material, it leaves that portion either upon the support 34 or within the sandwich biscuit 62 upon the tray 46. If it is deposited upon the support 34, this support is then withdrawn so as to allow it to be deposited within the biscuit 62 upon the tray 35. The tray 35 may then be withdrawn and the other sandwich biscuit forming the upper layer of the sandwich may then be placed over it so as to form a closed container for the filler.

If the filler is deposited upon a biscuit on the tray 46, the slide 50 is first drawn outwardly so as to lower the tray away from the knife 17, after which the tray may be easily withdrawn and the sandwich completed as just described.

It will be seen from the above that a means has been provided whereby a sandwich may be formed with a filler composed in part of liquid ingredients, but in which that liquid is not allowed to escape by virtue of the formation of the outer layers of the sandwich. It is noted in this connection that these outer layers are preferably formed of a shortened dough somewhat in the nature of pie crust or biscuit dough so that it will resist any tendency of the liquid filler material to soak through. It will also be seen that by virtue of the invention disclosed herein a sandwich can be easily and quickly prepared without the necessity for handling the filler materials with the hands and without any unnecessary exposure of the filler material to dust, dirt or the like. It will further be seen that a means is provided for maintaining the temperature of the filler material at the point at which it is desired to be served, and that no part of the filler material is exposed to the outer air from the time that it is placed in the sandwich machine until it is deposited on one of the outer layers of the sandwich. It is further to be observed that a means has been provided for forming a filler composed partly of liquid into the proper form for use in connection with the machine of this invention, and that it may be so formed and then chilled to form substantially a solid body of filler material so that it may be easily handled. Furthermore, by use of the flexible receptacle which is placed within the mold, the body of filler material is maintained in its proper shape until it is chilled, and at the same time all necessity for handling the filler material with the hands is eliminated.

It is to be understood that various changes in the details of construction and arrangement of parts may be made such as for instance in the cross sectional shape of the receptacle for the body of filler material, or in the composition of the filler material used. Other changes may likewise be made without departing from the spirit or scope of this invention as set forth in the appended claims.

What I claim is:—

1. In a sandwich making machine, a closed cabinet having an opening at the lower part of its front, a stationary supporting structure within and upon the bottom of the cabinet, a unit comprising an open top and bottom receptacle for receiving a filling and an insulating structure forming, in connection with the receptacle a chamber surrounding the latter for receiving a preservative for the filling, said unit being removably mounted upon said supporting structure, a knife at and normally closing the open bottom of said receptacle, said knife being slidably mounted in said supporting structure for slicing the filler, an upstanding stationary open top and bottom combined slice guide and retainer element arranged below the path of the knife for guiding and retaining the slice severed from the filler, a slidable member for positioning below said element to temporarily support the slice within the latter, slidable means mounted in said structure for positioning an outer layer of a sandwich to receive the slice of the filler from said element when said member is removed from slice supporting position, and said member, slidable means and knife extended outwardly through said opening at the front of the cabinet.

2. In a sandwich making machine, a closed cabinet having an opening at the lower part of its front, a stationary supporting structure within and upon the bottom of the cabinet, a unit comprising an open top and bottom receptacle for receiving a filler and an insulating structure forming, in connection with the receptacle, a chamber surrounding the latter for receiving a preservative for the filling, said unit being removably mounted upon said supporting structure, a knife at and normally closing the open bottom of said receptacle, said knife being slidably mounted in said supporting structure for slicing the filler, an upstanding stationary open top and bottom combined slice guide and retainer element arranged below the path of the knife for guiding and retaining the slice severed from the filler, a slidable member for positioning below said element to temporarily support the slice within the latter, slidable means mounted in said structure for positioning an outer layer of a sandwich to receive the slice of the filler from said element when said member is removed from slice supporting position, said member, slidable means and knife extended outwardly through said opening at the front of the cabinet, said insulating structure being of rectangular contour, and said receptacle being of oval contour and formed with a flared upper end.

3. In a sandwich making machine, a closed cabinet having an opening at the lower part of its front, a stationary supporting structure within and upon the bottom of the cabinet, a unit comprising an open top and bottom receptacle for receiving a filler and an insulating structure forming in connection with the receptacle a chamber surrounding the latter for receiving a preservative for the filling, said unit being removably mounted upon said supporting structure, a knife at and normally closing the open bottom of said receptacle, said knife being slidably mounted in said supporting structure for slicing the filler, an upstanding stationary open top and bottom combined slice guide and retainer element arranged below the path of the knife for guiding and retaining the slice severed from the filler, a slidable member for positioning below said element to temporarily support the slice within the latter, slidable means mounted in said structure for positioning an outer layer of a sandwich to receive the slice of the filler from said element when said member is removed from slice supporting position, said member, slidable means and knife extended outwardly through said opening at the front of the cabinet, and said insulating structure provided at its top with an inlet to said chamber and at the lower end of one of its sides with an outlet for said chamber.

4. In a sandwich making machine a shiftable tray having upstanding means at its sides for slidably supporting it from a pair of spaced parallel guideways, said tray being formed on its upper face between said means with an open top upstanding combined holder, receiver and positioner element for positioning an outer layer of a sandwich to have deposited thereon a slice of filler, a stationary open top and bottom combined filler slice guide and retainer element arranged above said tray for guiding the slice of filler to be deposited upon said layer, and shiftable means arranged above and below the guide and retainer element for respectively forming the slice of filler to be guided by said guide and retainer element and for temporarily supporting the slice within the guide and retainer element.

JAMES H. HERMAN.